United States Patent
Sawada

(10) Patent No.: US 8,020,371 B2
(45) Date of Patent: Sep. 20, 2011

(54) CATALYST DETERIORATION DETECTION DEVICE

(75) Inventor: Hiroshi Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 628 days.

(21) Appl. No.: 12/223,287

(22) PCT Filed: Jun. 8, 2007

(86) PCT No.: PCT/JP2007/061622
§ 371 (c)(1),
(2), (4) Date: Jul. 25, 2008

(87) PCT Pub. No.: WO2007/145141
PCT Pub. Date: Dec. 21, 2007

(65) Prior Publication Data
US 2010/0146936 A1   Jun. 17, 2010

(30) Foreign Application Priority Data
Jun. 16, 2006   (JP) ................................. 2006-167663

(51) Int. Cl.
*F01N 3/18*   (2006.01)
(52) U.S. Cl. ........................................... 60/285; 60/277
(58) Field of Classification Search .................. 60/277, 60/285, 286, 295, 303
See application file for complete search history.

(56) References Cited

U.S. PATENT DOCUMENTS

| 5,414,996 A | 5/1995 | Sawada et al. |
| 2004/0006971 A1 * | 1/2004 | Kamoto et al. ................. 60/277 |

FOREIGN PATENT DOCUMENTS

| JP | B2-2806248 | 7/1998 |
| JP | B2-2812023 | 8/1998 |
| JP | B2-3264234 | 12/2001 |
| JP | A-2004-044450 | 2/2004 |
| JP | A-2004-176611 | 6/2004 |
| JP | A-2004-245051 | 9/2004 |
| JP | A-2004-316459 | 11/2004 |
| JP | A-2005-009401 | 1/2005 |
| JP | A-2005-194981 | 7/2005 |

* cited by examiner

*Primary Examiner* — Thomas Denion
*Assistant Examiner* — Jonathan Matthias
(74) *Attorney, Agent, or Firm* — Oliff & Berridge, PLC

(57) ABSTRACT

The present invention provides a catalyst deterioration detection device that can avoid erroneous detection of catalyst deterioration by averting the influence of gas status changes at a catalyst outlet on the oxygen storage amount.

Step 106 is performed to set a lean side target air-fuel ratio at afL1 and a rich side target air-fuel ratio at afR1 and calculate a maximum oxygen storage amount Cmax1. Next, step 108 is performed to set the lean side target air-fuel ratio at afL2 and the rich side target air-fuel ratio at afR2 and calculate a maximum oxygen storage amount Cmax2. Subsequently, step 110 is performed to set the lean side target air-fuel ratio at afL3 and the rich side target air-fuel ratio at afR3 and calculate a maximum oxygen storage amount Cmax3. If all the calculated maximum oxygen storage amounts Cmax1, Cmax2, Cmax3 are equal to or smaller than a reference value Cmaxth, step 116 is performed to detect catalyst deterioration.

13 Claims, 6 Drawing Sheets

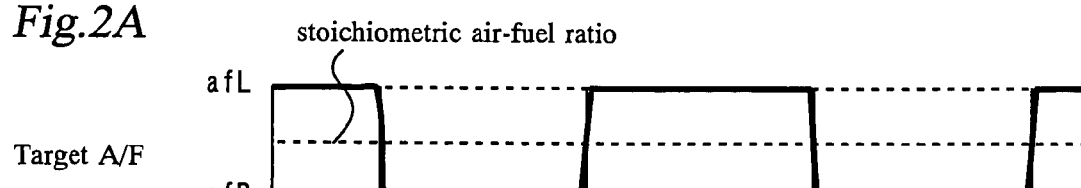
*Fig.2A* Target A/F
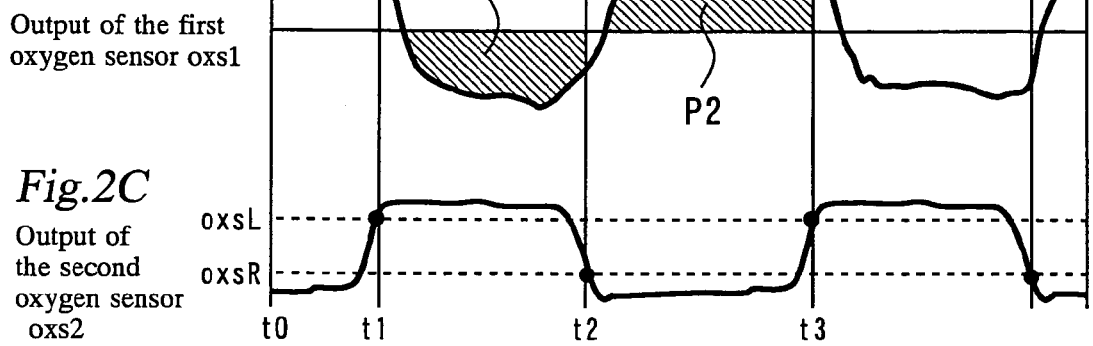
*Fig.2B* Output of the first oxygen sensor oxs1
*Fig.2C* Output of the second oxygen sensor oxs2
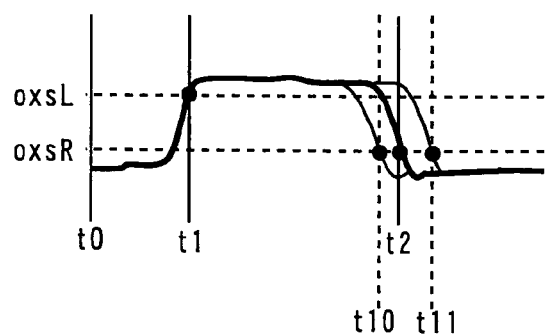
*Fig.3*

CATALYST DETERIORATION DETECTION DEVICE

TECHNICAL FIELD

The present invention relates to a catalyst deterioration detection device that detects catalyst deterioration in accordance with an oxygen storage amount.

BACKGROUND ART

A known device disclosed, for instance, in Patent Document 1 exercises active control to forcibly switch the air-fuel ratio prevailing upstream of a catalyst between a lean air-fuel ratio and rich air-fuel ratio to measure the amount of oxygen storage by the catalyst. This device detects catalyst deterioration in accordance with the measured oxygen storage amount.

Patent Document 1: JP-A-2004-176611
Patent Document 2: Japanese Patent No. 2812023
Patent Document 3: Japanese Patent No. 3264234
Patent Document 4: Japanese Patent No. 2806248

DISCLOSURE OF INVENTION

Problem to be Solved by the Invention

When the output of a sensor installed downstream of the catalyst changes (inverts), the aforementioned active control is exercised to change the air-fuel ratio prevailing upstream of the catalyst.

However, the composition and concentration of unburned HC, the composition of NOx gas, the concentration of CO gas, and the like may change at a catalyst outlet due, for instance, to variations in the catalyst bed temperature, the exhaust gas amount, or the air-fuel ratio prevailing upstream of the catalyst. These gas status changes at the catalyst outlet destabilize the timing with which the output of the sensor positioned downstream of the catalyst changes (inverts). If, for instance, the output of the sensor positioned downstream of the catalyst changes (inverts) prematurely, the measured oxygen storage amount turns out to be smaller than the actual oxygen storage amount. Consequently, the catalyst is erroneously judged to be deteriorated even when it is normal.

The present invention has been made to solve the above problem. An object of the present invention is to provide a catalyst deterioration detection device that can avoid erroneous detection of catalyst deterioration by averting the influence of gas status changes at a catalyst outlet on the oxygen storage amount.

Means for Solving the Problem

To achieves the above-mentioned purpose, the first aspect of the present invention is a catalyst deterioration detection device that detects catalyst deterioration by exercising active control for switching an exhaust air-fuel ratio prevailing upstream of a catalyst between a lean side and a rich side, the catalyst deterioration detection device comprising:

an exhaust gas sensor, which is installed downstream of the catalyst to vary the output value in accordance with an exhaust air-fuel ratio prevailing downstream of the catalyst;

air-fuel ratio control means, which exercises control to set the exhaust air-fuel ratio prevailing upstream of the catalyst at a plurality of different lean side air-fuel ratios and rich side air-fuel ratios;

oxygen storage amount calculation means, which calculates the oxygen excess/deficiency amount of an inflow to the catalyst before a change in the output value of the exhaust gas sensor at each of the plurality of different lean side air-fuel ratios and rich side air-fuel ratios, and calculates the oxygen storage amount of the catalyst in accordance with the oxygen excess/deficiency amount; and deterioration detection means, which detects the deterioration of the catalyst in accordance with a plurality of oxygen storage amounts calculated by the oxygen storage amount calculation means.

The second aspect of the present invention is a catalyst deterioration detection device that detects catalyst deterioration by exercising active control for switching an exhaust air-fuel ratio prevailing upstream of a catalyst between a lean side and a rich side, the catalyst deterioration detection device comprising:

an exhaust gas sensor, which is installed downstream of the catalyst to vary the output value in accordance with an exhaust air-fuel ratio prevailing downstream of the catalyst;

air-fuel ratio control means, which exercises control to set the exhaust air-fuel ratio prevailing upstream of the catalyst at a plurality of different lean side air-fuel ratios and rich side air-fuel ratios;

oxygen storage amount calculation means, which calculates the oxygen excess/deficiency amount of an inflow to the catalyst before a change in the output value of the exhaust gas sensor at each of the plurality of different lean side air-fuel ratios and rich side air-fuel ratios, and calculates the oxygen storage amount of the catalyst in accordance with the oxygen excess/deficiency amount; and deterioration detection means, which detects the deterioration of the catalyst in accordance with a plurality of oxygen storage amounts calculated by the oxygen storage amount calculation means;

wherein the air-fuel ratio control means performs at least a control operation for switching to a lean side air-fuel ratio and a rich side air-fuel ratio with reference to a particular air-fuel ratio and a control operation for switching to a lean side air-fuel ratio and a rich side air-fuel ratio with reference to an air-fuel ratio other than the particular air-fuel ratio.

The third aspect of the present invention is the catalyst deterioration detection device according to the second aspect of the present invention, wherein the air-fuel ratio control means performs at least two control operations out of three different control operations for switching between a lean side air-fuel ratio and a rich side air-fuel ratio with reference to a stoichiometric air-fuel ratio, switching between a lean side air-fuel ratio and a rich side air-fuel ratio with reference to an air-fuel ratio leaner than the stoichiometric air-fuel ratio, and switching between a lean side air-fuel ratio and a rich side air-fuel ratio with reference to an air-fuel ratio richer than the stoichiometric air-fuel ratio.

The fourth aspect of the present invention is a catalyst deterioration detection device that detects catalyst deterioration by exercising active control for switching an exhaust air-fuel ratio prevailing upstream of a catalyst between a lean side and a rich side, the catalyst deterioration detection device comprising:

an exhaust gas sensor, which is installed downstream of the catalyst to vary the output value in accordance with an exhaust air-fuel ratio prevailing downstream of the catalyst;

air-fuel ratio control means, which exercises control to set the exhaust air-fuel ratio prevailing upstream of the catalyst at a plurality of different lean side air-fuel ratios and rich side air-fuel ratios;

oxygen storage amount calculation means, which calculates the oxygen excess/deficiency amount of an inflow to the catalyst before a change in the output value of the exhaust gas sensor at each of the plurality of different lean side air-fuel ratios and rich side air-fuel ratios, and calculates the oxygen storage amount of the catalyst in accordance with the oxygen excess/deficiency amount; and deterioration detection means, which detects the deterioration of the catalyst in accordance with a plurality of oxygen storage amounts calculated by the oxygen storage amount calculation means;

wherein the air-fuel ratio control means exercises control for switching to a plurality of lean side air-fuel ratios and rich side air-fuel ratios with reference to a stoichiometric air-fuel ratio, the plurality of lean side air-fuel ratios and rich side air-fuel ratios being different in the degree of deviation from the stoichiometric air-fuel ratio.

The fifth aspect of the present invention is the catalyst deterioration detection device according to any one of the first to fourth aspect of the present invention, wherein the deterioration detection means detects the deterioration of the catalyst when all the plurality of oxygen storage amounts calculated by the oxygen storage amount calculation means are equal to or smaller than a reference value.

The sixth aspect of the present invention is the catalyst deterioration detection device according to any one of the first to fifth aspect of the present invention, wherein the air-fuel ratio control means successively switches to a plurality of different lean side air-fuel ratios and rich side air-fuel ratios in a predefined operating state.

Advantages of the Invention

The first aspect of the present invention sets the exhaust air-fuel ratio prevailing upstream of the catalyst at a plurality of different lean air-fuel ratios and rich air-fuel ratios and calculates the respective amounts of oxygen storage by the catalyst. At least one of the calculated oxygen storage amounts is not affected by gas status changes at a catalyst outlet. Therefore, the first aspect of the present invention makes it possible to avoid erroneous catalyst deterioration detection that may result from gas status changes at the catalyst outlet.

The second aspect of the present invention performs at least control operations for switching between a lean air-fuel ratio and rich air-fuel ratio with reference to a control center air-fuel ratio and switching between a lean air-fuel ratio and rich air-fuel ratio with reference to another control center air-fuel ratio. Since two different control operations are performed in accordance with different control center air-fuel ratios, the second aspect of the present invention assures that the oxygen storage amount remains unaffected by gas status changes at the catalyst outlet.

The third aspect of the present invention performs at least two control operations out of three different control operations for switching between a lean air-fuel ratio and rich air-fuel ratio with reference to a stoichiometric air-fuel ratio, switching between a lean air-fuel ratio and rich air-fuel ratio with reference to an air-fuel ratio leaner than the stoichiometric air-fuel ratio, and switching between a lean air-fuel ratio and rich air-fuel ratio with reference to an air-fuel ratio richer than the stoichiometric air-fuel ratio. Consequently, the third aspect of the present invention assures that the oxygen storage amount remains unaffected by gas status changes at the catalyst outlet.

When the air-fuel ratio is to be set at a lean air-fuel ratio or rich air-fuel ratio with reference to a stoichiometric air-fuel ratio, the fourth aspect of the present invention sets the air-fuel ratio at a plurality of lean air-fuel ratios and rich air-fuel ratios that differ in the degree of deviation from the stoichiometric air-fuel ratio. Consequently, the fourth aspect of the present invention assures that the oxygen storage amount remains unaffected by gas status changes at the catalyst outlet.

According to the fifth aspect of the present invention, catalyst deterioration can be detected irrespective of the influence of gas status changes at the catalyst outlet if all the calculated oxygen storage amounts are smaller than the reference value.

According to the sixth aspect of the present invention, the air-fuel ratio control means successively switches to a plurality of different lean air-fuel ratios and rich air-fuel ratios in a predefined operating state. If switching to the plurality of different lean air-fuel ratios and rich air-fuel ratios is effected in different operating states, the influence of gas status changes at the catalyst outlet may be averted depending on the difference between operating states. When such switching is successively effected in a predefined operating state as described in the sixth aspect of the present invention, it is possible to prevent the influence of gas status changes at the catalyst outlet from being averted depending on the difference between operating states. Therefore, the influence of gas status changes at the catalyst outlet can be averted only when the air-fuel ratio is set at a plurality of different lean air-fuel ratios and rich air-fuel ratios. This makes it possible to detect catalyst deterioration with increased accuracy.

BRIEF DESCRIPTION OF THE DRAWINGS

FIG. 2 is a diagram depicting a typical method of calculating the maximum oxygen storage amount Cmax of the catalyst.

FIG. 3 depicts a case where the timing with which the output of the second oxygen sensor changes (inverts) is destabilized due to gas status changes at the catalyst outlet.

DESCRIPTION OF NOTATIONS

Figure 1:
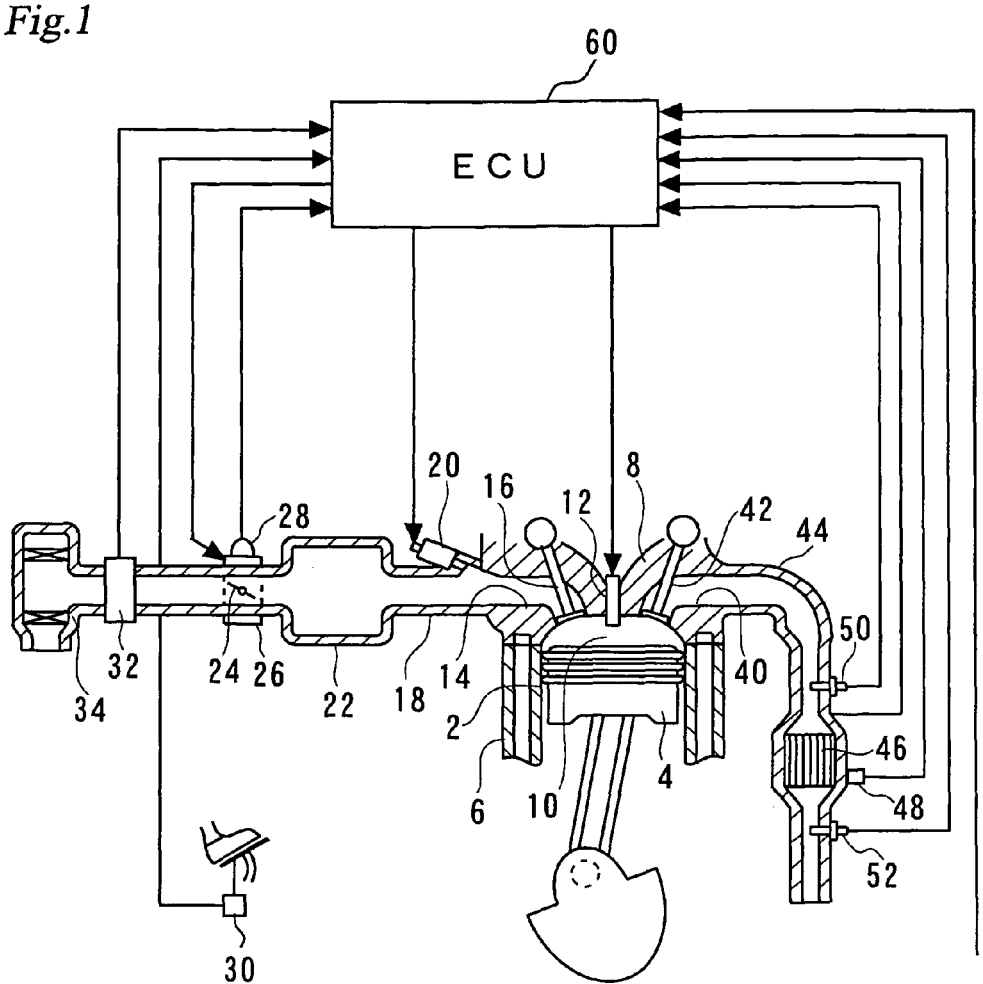
FIG. 1 is a diagram showing the configuration of a system according to an embodiment of the present invention.

1 An internal combustion engine
10 A combustion chamber
44 An exhaust path
46 An exhaust purification catalyst
48 A catalyst bed temperature sensor
50 A first oxygen sensor
52 A second oxygen sensor
60 An ECU (Electronic Control Unit)

BEST MODE FOR CARRYING OUT THE INVENTION

Embodiments of the present invention will now be described with reference to the accompanying drawings. Like elements in the drawings are identified by the same reference numerals and will not be redundantly described.

[System Configuration]

FIG. 1 is a diagram showing the configuration of a system according to an embodiment of the present invention. The system according to the present embodiment includes an internal combustion engine 1. The internal combustion engine 1 includes a plurality of cylinders 2; however, FIG. 1 shows only one of them.

The internal combustion engine 1 includes a cylinder block 6, which has a piston 4 inside it. A cylinder head 8 is mounted on the top of the cylinder block 6. The space between the upper surface of the piston 4 and the cylinder head 8 forms a combustion chamber 10. The cylinder head 8 has a spark plug 12 that ignites an air-fuel mixture in the combustion chamber 10.

The cylinder head 8 has an intake port 14, which communicates with the combustion chamber 10. A joint between the intake port 14 and combustion chamber 10 is provided with an intake valve 16. The intake port 14 is connected to an intake path 18. The intake path 18 is provided with an injector 20, which injects fuel to the vicinity of the intake port 14.

A surge tank 22 is installed in the middle of the intake path 18. A throttle valve 24 is installed upstream of the surge tank 22. The throttle valve 24 is an electronically controlled valve that is driven by a throttle motor 26. The throttle valve 24 is driven in accordance with an accelerator opening AA that is detected by an accelerator opening sensor 30. A throttle opening sensor 28, which detects a throttle opening TA, is installed near the throttle valve 24. An air flow meter 32, which detects an intake air amount Ga, is installed upstream of the throttle valve 24. An air cleaner 34 is installed upstream of the air flow meter 32.

The cylinder head 8 also has an exhaust port 40, which communicates with the combustion chamber 10. A joint between the exhaust port 40 and combustion chamber 10 is provided with an exhaust valve 42. The exhaust port 40 is connected to an exhaust path 44. The exhaust path 44 is provided with an exhaust purification catalyst 46 (hereinafter referred to as the catalyst), which purifies an exhaust gas. The catalyst 46 is provided with a catalyst bed temperature sensor 48, which detects the temperature of a catalyst bed. In the exhaust path 44, a first oxygen sensor 50 is installed upstream of the catalyst 46, whereas a second oxygen sensor 52 is installed downstream of the catalyst 46. The first and second oxygen sensors 59, 52 are configured to detect the oxygen concentration in the exhaust gas.

The system according to the present embodiment also includes an ECU (Electronic Control Unit) 60, which serves as a control device. The output end of the ECU 60 is connected, for instance, to the spark plug 12, injector 20, and throttle motor 26. The input end of the ECU 60 is connected, for instance, to the throttle opening sensor 28, accelerator opening sensor 30, air flow meter 32, catalyst bed temperature sensor 48, and oxygen sensors 50, 52.

The ECU 60 can exercise active control in which a target air-fuel ratio for the air-fuel mixture supply to a cylinder is controlled to forcibly switch the exhaust air-fuel ratio prevailing upstream of the catalyst between a fuel lean side (hereinafter abbreviated to the lean side) and a fuel rich side (hereinafter abbreviated to the rich side).

[Features]

According to the system described above, the maximum oxygen storage amount Cmax of the catalyst 46 can be calculated by computing the oxygen excess/deficiency amount of an exhaust gas inflow to the catalyst 46 during the time interval between the instant at which the exhaust air-fuel ratio prevailing upstream of the catalyst is forcibly changed from the rich side (or the lean side) to the lean side (or the rich side) and the instant at which the output of the oxygen sensor installed downstream of the catalyst changes (inverts). In other words, the maximum oxygen storage amount Cmax of the catalyst 46 can be calculated by exercising active control.

The method of calculating the maximum oxygen storage amount Cmax of the catalyst will now be described with reference to FIG. 2. FIG. 2 is a diagram depicting a typical method of calculating the maximum oxygen storage amount Cmax of the catalyst. More specifically, FIG. 2A shows a target air-fuel ratio (target A/F) setting for the air-fuel mixture to be supplied to a cylinder; FIG. 2B shows changes in the output of the first oxygen sensor oxs1, which is installed upstream of the catalyst; and FIG. 2C shows changes in the output of the second oxygen sensor oxs2, which is installed downstream of the catalyst.

The target air-fuel ratio for the air-fuel mixture to be supplied to a cylinder (inside the combustion chamber 10) is set at a lean side target value afL as shown in FIG. 2A for the purpose of saturating the oxygen storage capacity of the catalyst 46 at time to. In this state, the first oxygen sensor output oxs1 is high because a lean exhaust gas containing oxygen is discharged from the cylinder. Further; as the lean exhaust gas flows into the catalyst 46, the catalyst 46 occludes excess oxygen in the exhaust gas. While the oxygen storage capacity of the catalyst 46 is unsaturated, the second oxygen sensor output oxs2 is low because the lean exhaust gas does not blow through the catalyst 46.

When the oxygen storage capacity of the catalyst 46 subsequently becomes saturated, the lean exhaust gas blows through the catalyst 46. Therefore, the second oxygen sensor output oxs2 gradually rises.

When the second oxygen sensor output oxs2 reaches a leanness judgment value oxsL at time t1, the target air-fuel ratio switches to a rich side target value afR as shown in FIG. 2A. A rich exhaust gas is then discharged from the cylinder to lower the first oxygen sensor output oxs1. When the rich exhaust gas flows into the catalyst 46, a reducing agent in the exhaust gas works so that the oxygen occluded by the catalyst 46 is reduced and expelled. This causes the second oxygen sensor output oxs2 to rise.

When the oxygen occluded by the catalyst 46 is consumed later, the rich exhaust gas blows through the catalyst 46. Therefore, the second oxygen sensor output oxs2 gradually lowers.

When the second oxygen sensor output oxs2 reaches a richness judgment value oxsR at time t2, the target air-fuel ratio switches to the lean side target value afL as shown in FIG. 2A for the purpose of allowing the catalyst 46 to occlude oxygen. Portion P1, which is hatched with lines running diagonally to the upper right in FIG. 2B, corresponds to the amount of oxygen that is released from the catalyst 46 during a period between time t1 and time t2 during which the second oxygen sensor output oxs2 changes (inverts). In other words, the amount of oxygen released from the catalyst 46 can be determined by totaling the amount of oxygen deficiency in the exhaust gas, which is set to be rich, during a period between time t1 and t2.

When the target air-fuel ratio is set at the lean side target value afL, the first oxygen sensor output oxs1 rises because the lean exhaust gas is discharged from the cylinder. When the lean exhaust gas flows into the catalyst 46, the catalyst 46 occludes excess oxygen in the exhaust gas. While the oxygen is occluded by the catalyst 46, the lean exhaust gas does not blow through the catalyst 46. Consequently, the second oxygen sensor output oxs2 lowers.

When the oxygen storage capacity of the catalyst 46 subsequently becomes saturated, the lean exhaust gas blows through the catalyst 46. Therefore, the second oxygen sensor output oxs2 gradually rises.

When the second oxygen sensor output oxs2 reaches the leanness judgment value oxsL at time t3, the target air-fuel ratio switches to the rich side target value afR as shown in FIG. 2A. Portion P2, which is hatched with lines running diagonally to the lower right in FIG. 2B, corresponds to the amount of oxygen that is occluded by the catalyst 46 during a period between time t2 and time t3 during which the second oxygen sensor output oxs2 changes (inverts). In other words, the amount of oxygen occluded by the catalyst 46 can be determined by totaling the amount of oxygen excess in the exhaust gas, which is set to be lean, during a period between time t2 and time t3.

The maximum oxygen storage amount Cmax of the catalyst 46 is obtained by calculating the average value of the oxygen release amount and oxygen storage amount, which are determined as described above. When the maximum oxygen storage amount Cmax is smaller than a reference value, it can be judged that the catalyst 46 is deteriorated.

Meanwhile, the components and concentration of HC gas, the components and concentration of NOx gas, the concentration of CO gas, and the like may change at a catalyst outlet depending, for instance, on the catalyst bed temperature, changes in the air-fuel ratio prevailing upstream of the catalyst in a steady driving mode, and the amount of exhaust gas inflow to the catalyst. These gas status changes at the catalyst outlet may affect the output of the second oxygen sensor installed downstream of the catalyst and destabilize the timing with which the sensor output changes (inverts). Under the above circumstances, the maximum oxygen storage amount Cmax is determined by switching the target air-fuel ratio between the rich side and lean side as described above in accordance with output changes in the oxygen sensor installed downstream of the catalyst (that is, oxygen concentration changes). Therefore, catalyst deterioration may be erroneously detected because the maximum oxygen storage amount Cmax cannot be determined with high accuracy.

FIG. 3 depicts a case where the timing with which the output of the second oxygen sensor changes (inverts) is destabilized due to gas status changes at the catalyst outlet. In FIG. 3, time t2 is the time at which the second oxygen sensor should normally formulate a richness judgment. Owing, for instance, to gas component changes at the outlet, however, the richness judgment may be formulated at time t10, which is earlier than the normal richness judgment time t2, or at time t11, which is later than the normal richness judgment time t2. If the richness judgment is formulated at time t11, which is later than the normal richness judgment time t2, the calculated maximum oxygen storage amount Cmax is larger than a normal value so that the catalyst 46 is judged to be normal. There is no problem with this catalyst judgment. However, if the richness judgment is formulated at time t10, which is earlier than the normal richness judgment time t2, the calculated maximum oxygen storage amount Cmax is smaller than a normal value so that the catalyst 46 is erroneously judged to be deteriorated.

Similarly, if a leanness judgment is formulated at a time earlier than the normal leanness judgment time (time t3 in FIG. 3), the catalyst 46 is erroneously judged to be deteriorated.

A method for avoiding the above erroneous catalyst deterioration detection might be to increase the number of rich/lean switchings during active control, determine the oxygen release amount and oxygen storage amount a number of times, and average the obtained oxygen release amounts and oxygen storage amounts. However, even if the number of switchings is increased as described above, the richness judgment time or leanness judgment time does not significantly changes. This makes it difficult to avoid erroneous catalyst deterioration detection.

Figure 4:
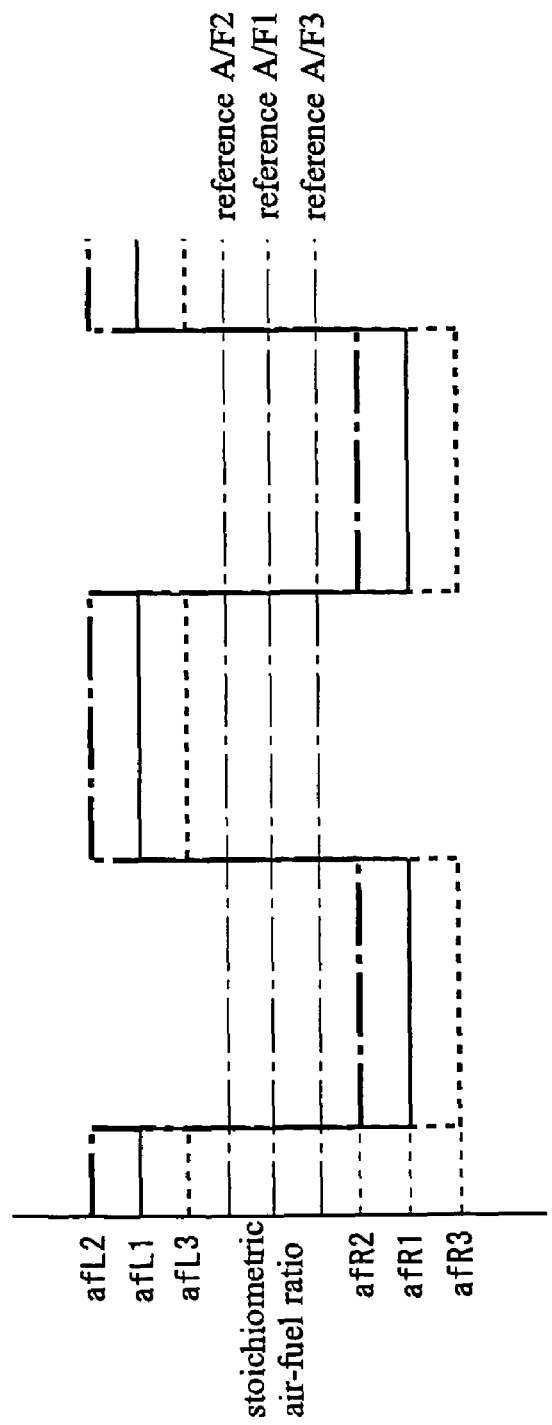
FIG. 4 shows lean side target values and rich side target values that represent the target air-fuel ratio.

As such being the case, the present embodiment changes the target air-fuel ratio as described below in order to avoid erroneous detection that may result from gas status changes at the catalyst outlet. FIG. 4 shows lean side target values and rich side target values that represent the target air-fuel ratio in the present embodiment.

As shown in FIG. 4, the present embodiment exercises control (14.6±0.5) for switching the target air-fuel ratio between a lean side target value afL1 (=15.1) and a rich side target value afR1 (=14.1) with reference to a stoichiometric air-fuel ratio A/F1 (=14.6), control (14.7±0.5) for switching the target air-fuel ratio between a lean side target value afL2 (=15.2) and a rich side target value afR2 (=14.2) with reference to an air-fuel ratio A/F2 (=14.7) that is leaner than the stoichiometric air-fuel ratio, and control (14.5±0.5) for switching the target air-fuel ratio between a lean side target value afL3 (=15.0) and a rich side target value afR3 (=14.0) with reference to an air-fuel ratio A/F3 (=14.5) that is richer than the stoichiometric air-fuel ratio. In other words, the present embodiment performs a plurality of active control operations that differ in the reference air-fuel ratio. The oxygen release amounts and oxygen storage amounts determined in each control operation are then averaged to calculate the maximum oxygen storage amount Cmax1, Cmax2, Cmax3 concerning each control operation.

According to the studies made by the inventor of the present invention, at least one of the plurality of maximum oxygen storage amounts Cmax1, Cmax2, Cmax3 is unaffected by the gas status changes at the catalyst outlet. Therefore, if all of these maximum oxygen storage amounts Cmax1, Cmax2, Cmax3 are smaller than a reference value Cmaxth, the catalyst 46 is judged to be deteriorated without regard to the gas status changes at the catalyst outlet. On the other hand, if one of the plurality of maximum oxygen storage amounts Cmax1, Cmax2, Cmax3 is greater than the reference value Cmaxth, the catalyst 46 is judged to be normal no matter whether any maximum oxygen storage amount is smaller than the reference value Cmaxth.

Consequently, the present embodiment makes it possible to avoid erroneous catalyst deterioration detection that may result from gas status changes at the catalyst outlet.

[Details of Process Performed]

Figure 5:
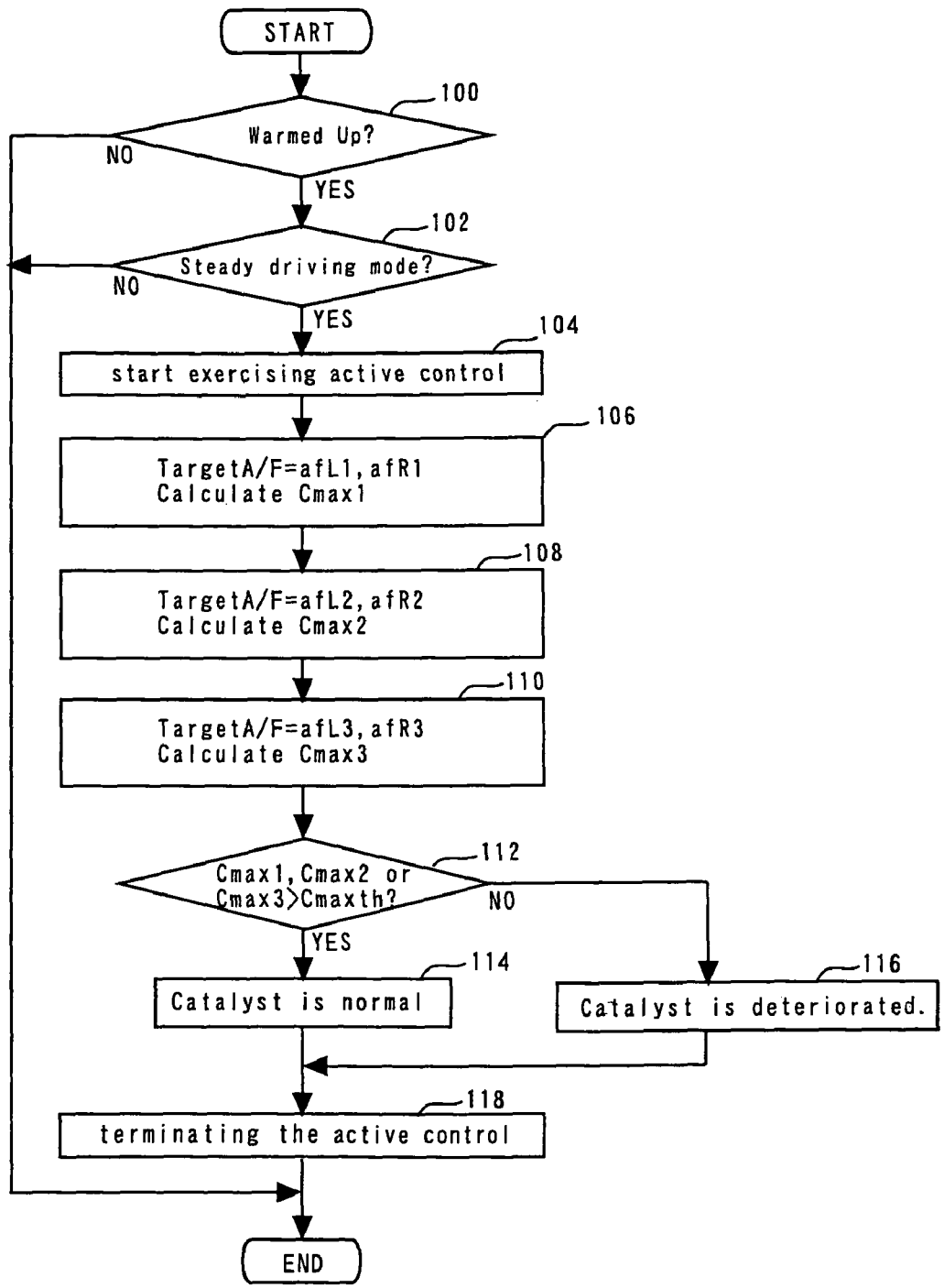
FIG. 5 is a flowchart showing a routine that the ECU 60 executes in the present embodiment.

FIG. 5 is a flowchart showing a routine that the ECU 60 executes in the present embodiment.

According to the routine shown in FIG. 5, the first step (step 100) is performed to judge whether the catalyst and internal combustion engine are completely warmed up. Next, step 102 is performed to judge whether the internal combustion engine 1 is in a steady driving mode. Steps 100 and 102 are performed to judge whether the prerequisites for active control are satisfied.

If the judgment result obtained in step 100 indicates that warm-up is not completed, or if the judgment result obtained in step 102 indicates that the internal combustion engine 1 is not in the steady driving mode, the routine terminates. If, on the other hand, the judgment result obtained in step 102 indicates that the internal combustion engine 1 is in the steady driving mode, that is, the prerequisites for active control are satisfied, step 104 is performed to start exercising active control.

First of all, step 106 is performed to set the lean side target value and rich side target value for the target air-fuel ratio at afL1 and afR1, respectively, and calculate the maximum oxygen storage amount Cmax1. In step 106, the routine exercises control to switch the target air-fuel ratio between the lean side target value afL1 and rich side target value afR1 with reference to the stoichiometric air-fuel ratio and calculates the maximum oxygen storage amount Cmax1.

Next, step S108 is performed to set the lean side target value and rich side target value for the target air-fuel ratio at afL2 and afR2, respectively, and calculate the maximum oxygen storage amount Cmax2. In step 108, the routine exercises control to switch the target air-fuel ratio between the lean side target value afL2 and rich side target value afR2 with reference to an air-fuel ratio leaner than the stoichiometric air-fuel ratio and calculates the maximum oxygen storage amount Cmax2.

Further, step 110 is performed to set the lean side target value and rich side target value for the target air-fuel ratio at afL3 and afR3, respectively, and calculate the maximum oxygen storage amount Cmax3. In step 110, the routine exercises control to switch the target air-fuel ratio between the lean side target value afL3 and rich side target value afR3 with reference to an air-fuel ratio richer than the stoichiometric air-fuel ratio and calculates the maximum oxygen storage amount Cmax3.

Steps 106, 108, and 110 are sequentially performed as far as the operating state judged in step 102 persists. More specifically, the target air-fuel ratio is sequentially switched to a plurality of different lean side target values afL1, afL2, afL3 and rich side target values afR1, afR2, afR3 in a predefined operating state.

Next, step 112 is performed to judge which of the maximum oxygen storage amounts Cmax1, Cmax2, Cmax3 calculated in steps 106, 108, and 110 is greater than the reference value Cmaxth. One of the calculated maximum oxygen storage amounts Cmax1, Cmax2, Cmax3 is unaffected by the gas status changes at the catalyst outlet. Therefore, step 112 is performed to judge whether one of the maximum oxygen storage amounts that is unaffected by the gas status changes at the catalyst outlet is greater than the reference value Cmaxth.

If the judgment result obtained in step 112 indicates that one of the maximum oxygen storage amounts Cmax1, Cmax2, Cmax3 is greater than the reference value Cmaxth, step 114 is followed to judge that the catalyst is normal. If, on the other hand, the judgment result obtained in step 112 indicates that one of the maximum oxygen storage amounts Cmax1, Cmax2, Cmax3 is equal to or smaller than the reference value Cmaxth, that is, all the maximum oxygen storage amounts Cmax1, Cmax2, Cmax3 are equal to or smaller than the reference value Cmaxth, step 116 is followed to judge that the catalyst is deteriorated irrespective of gas status changes at the catalyst outlet.

Subsequently, the routine terminates the active control (step 118).

As described above, the routine shown in FIG. 5 calculates the maximum oxygen storage amounts Cmax1, Cmax2, Cmax3 in relation to different target air-fuel ratios. When all these calculated values are equal to or smaller than the reference value Cmaxth, the routine detects catalyst deterioration. At least one of the maximum oxygen storage amounts Cmax1, Cmax2, Cmax3 is unaffected by the gas status changes at the catalyst outlet. Therefore, it is possible to avoid erroneous catalyst deterioration detection that may result from gas status changes at the catalyst outlet.

Further, the routine shown in FIG. 5 can sequentially switch the target air-fuel ratio to a plurality of different lean side target values afL1, afL2, afL3 and rich side target values afR1, afR2, afR3 in a predefined operating state. Even in a steady driving mode, the influence of gas status changes at the catalyst outlet may be averted depending on the difference between operating states. Therefore, if the target air-fuel ratio switches to a plurality of different lean side target values afL1, afL2, afL3 and rich side target values afR1, afR2, afR3 in different operating states, the influence of gas status changes at the catalyst outlet may be averted depending on the difference between the operating states. If, on the other hand, switching to the plurality of different air-fuel ratios is successively effected in a predefined operating state, it is possible to prevent the influence of gas status changes at the catalyst outlet from being averted depending on the difference between the operating states. Therefore, the influence of gas status changes at the catalyst outlet can be averted only when switching to a plurality of different air-fuel ratios is effected. Consequently, catalyst deterioration can be detected with high accuracy.

Figure 6:
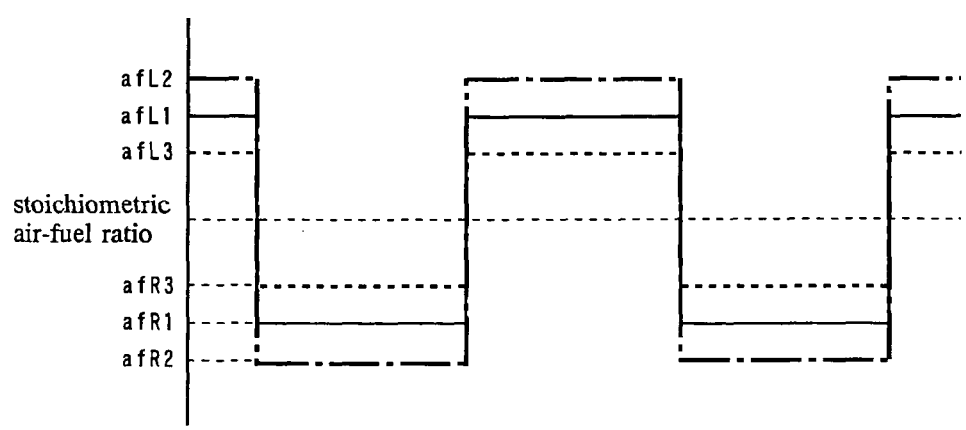
FIG. 6 is a diagram that shows lean side target values and rich side target values for the target air-fuel ratio according to a modified version of the present embodiment.

The present embodiment described above switches to a rich air-fuel ratio and lean air-fuel ratio that are deviated from the reference air-fuel ratio by the same amount (±0.5) while using the stoichiometric air-fuel ratio (14.6), lean side air-fuel ratio (14.7), or rich side air-fuel ratio (14.5) as the reference air-fuel ratio. However, the present invention does not always switch to the rich and lean air-fuel ratios in a manner described above. The present invention can also be applied to a case where the air-fuel ratio is changed as indicated in FIG. 6. FIG. 6 is a diagram that shows lean side target values and rich side target values for the target air-fuel ratio according to a modified version of the present embodiment.

As shown in FIG. 6, the modified version of the present embodiment exercises control (14.6±0.5) for switching the target air-fuel ratio between a lean side target value afL1 (=15.1) and a rich side target value afR1 (=14.1) with reference to the stoichiometric air-fuel ratio (=14.6), control (14.6±0.6) for switching the target air-fuel ratio between a lean side target value afL2 (=15.2) and a rich side target value afR2 (=14.0) with reference to the stoichiometric air-fuel ratio (=14.6), and control (14.6±0.4) for switching the target air-fuel ratio between a lean side target value afL3 (=15.0) and a rich side target value afR3 (=14.2) with reference to the stoichiometric air-fuel ratio (=14.6). In other words, the deviation of the lean or rich side target value from the stoichiometric air-fuel ratio varies.

The modified version of the present embodiment then calculates the maximum oxygen storage amounts concerning control operations as is the case with the foregoing embodiment. If all the maximum oxygen storage amounts are smaller than the reference value, the modified version of the present embodiment detects that the catalyst 46 is deteriorated. The greater the degree of deviation from the stoichiometric air-fuel ratio, the higher the speed of reaction in the catalyst, and thus the larger the calculated maximum oxygen storage amount. Therefore, different reference values may be used in step 112 in FIG. 5 to judge a plurality of maximum oxygen storage amounts. More specifically, when the degree of deviation from the stoichiometric air-fuel ratio is small, a small reference value may be used.

According to the studies made by the inventor of the present invention, at least one of the plurality of maximum oxygen storage amounts is unaffected by gas status changes at the catalyst outlet. Therefore, the modified version of the present embodiment can avoid erroneous catalyst deterioration detection that may result from gas status changes at the catalyst outlet.

Further, steps 106, 108, and 110 in FIG. 5 may alternatively be performed to switch the target air-fuel ratio to the same lean side and rich side target values a number of times (e.g., two or three times), and calculate and average the maximum oxygen storage amounts to determine the maximum oxygen storage amount for each step.

When the target air-fuel ratio is switched once to a lean side/rich side target value to determine the maximum oxygen storage amount, the maximum oxygen storage amount may be affected by the previously set target air-fuel ratio. In this instance, as the determined maximum oxygen storage amount is affected by the previously set target air-fuel ratio, the maximum oxygen storage amount may not be calculated with high accuracy.

However, when the target air-fuel ratio is switched to the same lean side/rich side target value a number of times to calculate and average the maximum oxygen storage amounts, the influence of the previously set target air-fuel ratio on the maximum oxygen storage amount can, be minimized. This makes it possible to determine the maximum oxygen storage amount with high precision and detect catalyst deterioration with high accuracy.

Figure 7:
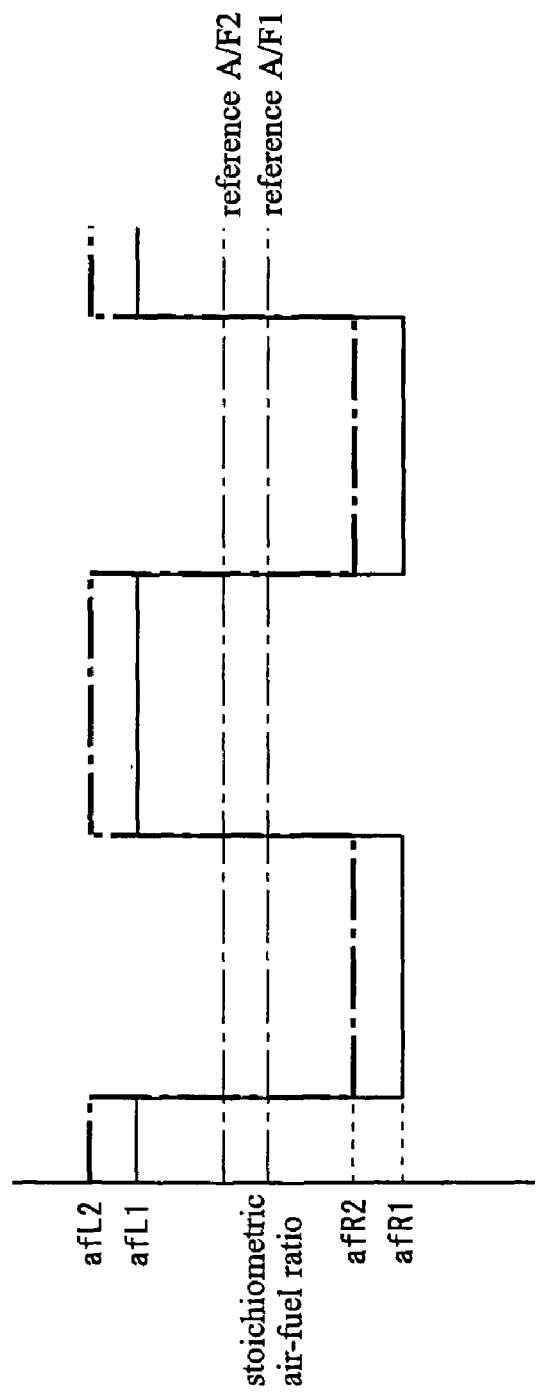
FIG. 7 is a diagram that shows lean side target values and rich side target values for the target air-fuel ratio according to another modified version of the present embodiment.

The present embodiment and its modified version both assume that the target air-fuel ratio is switched to three different lean side target values afL1, afL2, afL3 and three different rich side target values afR1, afR2, afR3. Alternatively, however, the influence of gas status changes at the catalyst outlet on either one of the maximum oxygen storage amounts can be averted by switching to at least two lean side target values and two rich side target values. For example, the above alternative provides the same advantages as the foregoing embodiment when it exercises control (14.6±0.5), as shown in FIG. 7, for switching the target air-fuel ratio between a lean side target value afL1 (=15.1) and a rich side target value afR1 (=14.1) with reference to the stoichiometric air-fuel ratio A/F1 (=14.6) and control (14.7±0.5) for switching the target air-fuel ratio between a lean side target value afL2 (=15.2) and a rich side target value afR2 (=14.2) with reference to a lean air-fuel ratio A/F2 (=14.7) that differs from the stoichiometric air-fuel ratio A/F1. FIG. 7 is a diagram that shows lean side target values and rich side target values for the target air-fuel ratio according to another modified version of the present embodiment, which has been described above.

Further, air-fuel ratio sensors may be used instead of the oxygen sensors 50, 52. In this case, too, the same advantages can be provided as is the case with the foregoing embodiment.

In the present embodiment, the catalyst 46 corresponds to the "catalyst" according to the first, second, and fourth aspects of the present invention; and the second oxygen sensor 52 corresponds to the "exhaust gas sensor" according to the first, second, and fourth aspects of the present invention. In the present embodiment and its modified versions, the "air-fuel ratio control means" according to the first to fourth and sixth aspects of the present invention is implemented when the ECU 60 performs steps 106, 108, and 110; the "oxygen storage amount calculation means" according to the first, second, and fourth aspects of the present invention is implemented when the ECU 60 performs steps 106, 108, and 110; the "deterioration detection means" according to the first, second, and fourth aspects of the present invention is implemented when the ECU 60 performs steps 112, 114, and 116; and the "deterioration detection means" according to the fifth aspect of the present invention is implemented when the ECU 60 performs steps 112 and 116.

The invention claimed is:

1. A catalyst deterioration detection device that detects catalyst deterioration by exercising active control for switching an exhaust air-fuel ratio prevailing upstream of a catalyst between a lean side and a rich side, the catalyst deterioration detection device comprising:
   an exhaust gas sensor, which is installed downstream of the catalyst and has an output value that varies in accordance with an exhaust air-fuel ratio prevailing downstream of the catalyst; and
   an electronic control unit that:
   (i) exercises control to set the exhaust air-fuel ratio prevailing upstream of the catalyst at a plurality of different lean side air-fuel ratios and rich side air-fuel ratios;
   (ii) calculates an oxygen excess-or-deficiency amount of an inflow to the catalyst before a change in the output value of the exhaust gas sensor at each of the plurality of different lean side air-fuel ratios and rich side air-fuel ratios, and calculates an oxygen storage amount of the catalyst for each of the plurality of different lean side air-fuel ratios and rich side air-fuel ratios in accordance with the oxygen excess-or-deficiency amount calculated for each of the plurality of different lean side air-fuel ratios and rich side air-fuel ratios; and
   (iii) detects whether the catalyst has deteriorated in accordance with the plurality of calculated oxygen storage amounts,
   wherein the plurality of calculated oxygen storage amounts used to determine whether the catalyst has deteriorated includes at least four oxygen storage amounts calculated from at least four oxygen excess-or-deficiency amounts obtained by causing the catalyst to go through at least two cycles of (a) storing oxygen until the catalyst is saturated with the oxygen and (b) releasing the stored oxygen until the oxygen stored in the catalyst has been consumed, such that the catalyst is saturated at least twice and the stored oxygen is consumed at least twice.

2. A catalyst deterioration detection device that detects catalyst deterioration by exercising active control for switching an exhaust air-fuel ratio prevailing upstream of a catalyst between a lean side and a rich side, the catalyst deterioration detection device comprising:
   an exhaust gas sensor, which is installed downstream of the catalyst and has an output value that varies in accordance with an exhaust air-fuel ratio prevailing downstream of the catalyst; and
   an electronic control unit that:
   (i) exercises control to set the exhaust air-fuel ratio prevailing upstream of the catalyst at a plurality of different lean side air-fuel ratios and rich side air-fuel ratios;
   (ii) calculates an oxygen excess-or-deficiency amount of an inflow to the catalyst before a change in the output value of the exhaust gas sensor at each of the plurality of different lean side air-fuel ratios and rich side air-fuel ratios, and calculates an oxygen storage amount of the catalyst for each of the plurality of different lean side air-fuel ratios and rich side air-fuel ratios in accordance with the oxygen excess-or-deficiency amount calculated for each of the plurality of different lean side air-fuel ratios and rich side air-fuel ratios; and
   (iii) detects whether the catalyst has deteriorated in accordance with the plurality of calculated oxygen storage amounts;
   wherein the electronic control unit performs at least a control operation for switching to a lean side air-fuel ratio and a rich side air-fuel ratio that are centered with respect to a particular air-fuel ratio and a control operation for switching to a lean side air-fuel ratio and a rich side air-fuel ratio that are centered with respect to an air-fuel ratio different from the particular air-fuel ratio, and wherein the plurality of calculated oxygen storage amounts used to determine whether the catalyst has deteriorated includes at least four oxygen storage amounts calculated from at least four oxygen excess-or-deficiency amounts obtained by causing the catalyst to go through at least two cycles of (a) storing oxygen until the catalyst is saturated with the oxygen and (b) releasing the stored oxygen until the oxygen stored in the catalyst has been consumed, such that the catalyst is saturated at least twice and the stored oxygen is consumed at least twice.

3. A catalyst deterioration detection device that detects catalyst deterioration by exercising active control for switching an exhaust air-fuel ratio prevailing upstream of a catalyst between a lean side and a rich side, the catalyst deterioration detection device comprising:

an exhaust gas sensor, which is installed downstream of the catalyst and has an output value that varies in accordance with an exhaust air-fuel ratio prevailing downstream of the catalyst; and an electronic control unit that:
(i) exercises control to set the exhaust air-fuel ratio prevailing upstream of the catalyst at a plurality of different lean side air-fuel ratios and rich side air-fuel ratios;
(ii) calculates an oxygen excess-or-deficiency amount of an inflow to the catalyst before a change in the output value of the exhaust gas sensor at each of the plurality of different lean side air-fuel ratios and rich side air-fuel ratios, and calculates an oxygen storage amount of the catalyst for each of the plurality of different lean side air-fuel ratios and rich side air-fuel ratios in accordance with the oxygen excess-or-deficiency amount calculated for each of the plurality of different lean side air-fuel ratios and rich side air-fuel ratios; and
(iii) detects whether the catalyst has deteriorated in accordance with the plurality of calculated oxygen storage amounts;

wherein the electronic control unit exercises control for switching to a plurality of lean side air-fuel ratios and rich side air-fuel ratios that are centered with respect to a stoichiometric air-fuel ratio, the plurality of lean side air-fuel ratios and rich side air-fuel ratios being different in a degree of deviation from the stoichiometric air-fuel ratio, and wherein the plurality of calculated oxygen storage amounts used to determine whether the catalyst has deteriorated includes at least four oxygen storage amounts calculated from at least four oxygen excess-or-deficiency amounts obtained by causing the catalyst to go through at least two cycles of (a) storing oxygen until the catalyst is saturated with the oxygen and (b) releasing the stored oxygen until the oxygen stored in the catalyst has been consumed, such that the catalyst is saturated at least twice and the stored oxygen is consumed at least twice.

4. A catalyst deterioration detection device that detects catalyst deterioration by exercising active control for switching an exhaust air-fuel ratio prevailing upstream of a catalyst between a lean side and a rich side, the catalyst deterioration detection device comprising:

an exhaust gas sensor, which is installed downstream of the catalyst and has an output value that varies in accordance with an exhaust air-fuel ratio prevailing downstream of the catalyst;

air-fuel ratio control means, which exercises control to set the exhaust air-fuel ratio prevailing upstream. of the catalyst at a plurality of different lean side air-fuel ratios and rich side air-fuel ratios;

oxygen storage amount calculation means, which calculates an oxygen excess-or-deficiency amount of an inflow to the catalyst before a change in the output value of the exhaust gas sensor at each of the plurality of different lean side air-fuel ratios and rich side air-fuel ratios, and calculates an oxygen storage amount of the catalyst for each of the plurality of different lean side air-fuel ratios and rich side air-fuel ratios in accordance with the oxygen excess-or-deficiency amount calculated for each of the plurality of different lean side air-fuel ratios and rich side air-fuel ratios; and deterioration detection means, which detects whether the catalyst has deteriorated in accordance with the plurality of oxygen storage amounts calculated by the oxygen storage amount calculation means, wherein the plurality of oxygen storage amounts calculated by the oxygen storage amount calculation means used by the deterioration detection means to determine whether the catalyst has deteriorated includes at least four oxygen storage amounts calculated from at least four oxygen excess-or-deficiency amounts obtained by causing the catalyst to go through at least two cycles of (a) storing oxygen until the catalyst is saturated with the oxygen and (b) releasing the stored oxygen until the oxygen stored in the catalyst has been consumed, such that the catalyst is saturated at least twice and the stored oxygen is consumed at least twice.

5. The catalyst deterioration detection device according to claim 4, wherein the deterioration detection means detects that the catalyst is deteriorated when all the plurality of oxygen storage amounts calculated by the oxygen storage amount calculation means are equal to or smaller than a reference value.

6. The catalyst deterioration detection device according to claim 4, wherein the air-fuel ratio control means successively switches to a plurality of different lean side air-fuel ratios and rich side air-fuel ratios in a predefined operating state.

7. A catalyst deterioration detection device that detects catalyst deterioration by exercising active control for switching an exhaust air-fuel ratio prevailing upstream of a catalyst between a lean side and a rich side, the catalyst deterioration detection device comprising:

an exhaust gas sensor, which is installed downstream of the catalyst and has an output value that varies in accordance with an exhaust air-fuel ratio prevailing downstream of the catalyst;

air-fuel ratio control means, which exercises control to set the exhaust air-fuel ratio prevailing upstream of the catalyst at a plurality of different lean side air-fuel ratios and rich side air-fuel ratios;

oxygen storage amount calculation means, which calculates an oxygen excess-or-deficiency amount of an inflow to the catalyst before a change in the output value of the exhaust gas sensor at each of the plurality of different lean side air-fuel ratios and rich side air-fuel ratios, and calculates an oxygen storage amount of the catalyst for each of the plurality of different lean side air-fuel ratios and rich side air-fuel ratios in accordance with the oxygen excess-or-deficiency amount calculated for each of theplurality of different lean side air-fuel ratios and rich side air-fuel ratios; and deterioration detection means, which detects whether the catalyst has deteriorated in accordance with the plurality of oxygen storage amounts calculated by the oxygen storage amount calculation means;

wherein the air-fuel ratio control means performs at least a control operation for switching to a lean side air-fuel ratio and a rich side air-fuel ratio that are centered with respect to a particular air-fuel ratio and a control operation for switching to a lean side air-fuel ratio and a rich side air-fuel ratio that are centered with respect to an air-fuel ratio different from the particular air-fuel ratio, and wherein the plurality of oxygen storage amounts calculated by the oxygen storage amount calculation means used by the deterioration detection means to determine whether the catalyst has deteriorated includes at least four oxygen storage amounts calculated from at least four oxygen excess-or-deficiency amounts obtained by causing the catalyst to go through at least two cycles of (a) storing oxygen until the catalyst is saturated with the oxygen and (b) releasing the stored oxygen until the oxygen stored in the catalyst has been consumed, such that the catalyst is saturated at least twice and the stored oxygen is consumed at least twice.

8. The catalyst deterioration detection device according to claim 7, wherein the air-fuel ratio control means performs at least two control operations out of three different control operations, the three different control operations including: (i) switching between a lean side air-fuel ratio and a rich side air-fuel ratio that are centered with respect to a stoichiometric air-fuel ratio, (ii) switching between a lean side air-fuel ratio and a rich side air-fuel ratio that are centered with respect to an air-fuel ratio leaner than the stoichiometric air-fuel ratio, and (iii) switching between a lean side air-fuel ratio and a rich side air-fuel ratio that are centered with respect to an air-fuel ratio richer than the stoichiometric air-fuel ratio.

9. The catalyst deterioration detection device according to claim 7, wherein the deterioration detection means detects that the catalyst is deteriorated when all the plurality of oxygen storage amounts calculated by the oxygen storage amount calculation means are equal to or smaller than a reference value.

10. The catalyst deterioration detection device according to claim 7, wherein the air-fuel ratio control means successively switches to a plurality of different lean side air-fuel ratios and rich side air-fuel ratios in a predefined operating state.

11. A catalyst deterioration detection device that detects catalyst deterioration by exercising active control for switching an exhaust air-fuel ratio prevailing upstream of a catalyst between a lean side and a rich side, the catalyst deterioration detection device comprising:
an exhaust gas sensor, which is installed downstream of the catalyst and has an output value that varies in accordance with an exhaust air-fuel ratio prevailing downstream of the catalyst;
air-fuel ratio control means, which exercises control to set the exhaust air-fuel ratio prevailing upstream of the catalyst at a plurality of different lean side air-fuel ratios and rich side air-fuel ratios;
oxygen storage amount calculation means, which calculates an oxygen excess-or-deficiency amount of an inflow to the catalyst before a change in the output value of the exhaust gas sensor at each of the plurality of different lean side air-fuel ratios and rich side air-fuel ratios, and calculates an oxygen storage amount of the catalyst for each of the plurality of different lean side air-fuel ratios and rich side air-fuel ratios in accordance with the oxygen excess-or-deficiency amount calculated for each of the plurality of different lean side air-fuel ratios and rich side air-fuel ratios; and
deterioration detection means, which detects whether the catalyst has deteriorated in accordance with the plurality of oxygen storage amounts calculated by the oxygen storage amount calculation means;
wherein the air-fuel ratio control means exercises control for switching to a plurality of lean side air-fuel ratios and rich side air-fuel ratios that are centered with respect to a stoichiometric air-fuel ratio, the plurality of lean side air-fuel ratios and rich side air-fuel ratios being different in a degree of deviation from the stoichiometric air-fuel ratio, and
wherein the plurality of oxygen storage amounts calculated by the oxygen storage amount calculation means used by the deterioration detection means to determine whether the catalyst has deteriorated includes at least four oxygen storage amounts calculated from at least four oxygen excess-or-deficiency amounts obtained by causing the catalyst to go through at least two cycles of (a) storing oxygen until the catalyst is saturated with the oxygen and (b) releasing the stored oxygen until the oxygen stored in the catalyst has been consumed, such that the catalyst is saturated at least twice and the stored oxygen is consumed at least twice.

12. The catalyst deterioration detection device according to claim 11, wherein the deterioration detection means detects that the catalyst is deteriorated when all the plurality of oxygen storage amounts calculated by the oxygen storage amount calculation means are equal to or smaller than a reference value.

13. The catalyst deterioration detection device according to claim 11, wherein the air-fuel ratio control means successively switches to a plurality of different lean side air-fuel ratios and rich side air-fuel ratios in a predefined operating state.

* * * * *